(12) United States Patent
Eguchi et al.

(10) Patent No.: US 12,194,712 B2
(45) Date of Patent: Jan. 14, 2025

(54) SHEET BODY

(71) Applicant: NITTO DENKO CORPORATION, Ibaraki (JP)

(72) Inventors: Kenichi Eguchi, Ibaraki (JP); Shinya Kotake, Ibaraki (JP); Daisuke Matsukuma, Ibaraki (JP); Aika Ishii, Ibaraki (JP); Hiroyuki Fujita, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 615 days.

(21) Appl. No.: 17/292,173

(22) PCT Filed: Nov. 11, 2019

(86) PCT No.: PCT/JP2019/044130
§ 371 (c)(1),
(2) Date: May 7, 2021

(87) PCT Pub. No.: WO2020/096070
PCT Pub. Date: May 14, 2020

(65) Prior Publication Data
US 2021/0323283 A1    Oct. 21, 2021

(30) Foreign Application Priority Data

Nov. 9, 2018 (JP) .................. 2018-211488

(51) Int. Cl.
| | |
|---|---|
| *B32B 7/12* | (2006.01) |
| *B32B 25/04* | (2006.01) |
| *B32B 25/08* | (2006.01) |
| *B32B 25/20* | (2006.01) |
| *B32B 27/36* | (2006.01) |
| *E04D 13/10* | (2006.01) |

(52) U.S. Cl.
CPC ............ *B32B 25/042* (2013.01); *B32B 7/12* (2013.01); *B32B 25/08* (2013.01); *B32B 25/20* (2013.01); *B32B 27/36* (2013.01); *B32B 2250/05* (2013.01); *B32B 2307/726* (2013.01); *B32B 2307/7265* (2013.01); *E04D 13/10* (2013.01)

(58) Field of Classification Search
None
See application file for complete search history.

(56) References Cited

U.S. PATENT DOCUMENTS

| | | | |
|---|---|---|---|
| 2002/0106225 A1* | 8/2002 | Maul | G03G 15/2025 399/325 |
| 2017/0130007 A1 | 5/2017 | Urata et al. | |
| 2018/0016444 A1* | 1/2018 | Michel | C09D 5/1675 |

FOREIGN PATENT DOCUMENTS

| | | |
|---|---|---|
| EP | 3 162 857 A1 | 5/2017 |
| JP | 7-148879 A | 6/1995 |
| JP | 2962986 B2 | 10/1999 |
| JP | 2001-207106 A | 7/2001 |
| JP | 2003-328308 A | 11/2003 |
| JP | 6245714 B2 | 12/2017 |

OTHER PUBLICATIONS

Office Action issued on Sep. 30, 2021 for corresponding Russian Patent Application No. 2021116473/05 (034698), along with an English translation.
Office Action issued on Sep. 4, 2023 for corresponding Japanese Patent Application No. 2020-555678, along with an English machine translation (9 pages).
International Search Report issued for corresponding International Patent Application No. PCT/JP2019/044130 on Dec. 10, 2019, along with an English translation.
Written Opinion issued for corresponding International Patent Application No. PCT/JP2019/044130 on Dec. 10, 2019.
Extended European Search Report issued on Jun. 20, 2022 for corresponding European Patent Application No. 19882602.6 (5 pages).

* cited by examiner

*Primary Examiner* — Sheeba Ahmed
(74) *Attorney, Agent, or Firm* — Hauptman Ham, LLP

(57) ABSTRACT

The purpose of the present invention is to provide a sheet body having an improved function of preventing icing and/or snow accretion. At least included are a solid oil-containing resin layer containing an oil and an oil-permeable surface resin layer that has higher wear resistance than the oil-containing resin layer and is layered on one of surfaces of the oil-containing resin layer. The oil included in the oil-containing resin layer includes a low-temperature exuding oil component capable of exuding from the oil-containing resin layer when a temperature decreases to a predetermined value or lower, and the surface resin layer has enough oil permeability to permeate the low-temperature exuding oil component exuding from the oil-containing resin layer to a surface of the surface resin layer that is opposite to a side of the oil-containing resin layer.

14 Claims, 3 Drawing Sheets

SHEET BODY

CROSS REFERENCE TO RELATED APPLICATION

This application is a National Stage of International Application No. PCT/JP2019/044130, filed on Nov. 11, 2019, which designates the United States and was published in Japan, and which is based upon and claims priority to Japanese Patent Application No. 2018-211488, filed on Nov. 9, 2018 in the Japan Patent Office. All of the aforementioned applications are hereby incorporated by reference in their entireties.

TECHNICAL FIELD

The present invention relates to sheet bodies, and more particularly to a sheet body capable of preventing icing and/or snow accretion.

BACKGROUND ART

Several products have been developed that can prevent icing and/or snow accretion on various structures such as the roofs of houses, power lines, mats, vehicles, or ships.

For instance, Japanese Patent Laid-Open No. 07-148879 (Patent Literature 1) discloses an ice coated snow-adhesion preventive sheet that can prevent attachment of ice coated snow to various structures in cold regions. This sheet includes a heat insulated layer consisting of a sponge material and a front surface layer laminated on the heat insulated layer, wherein the front surface layer is formed of rubber or resin dispersed so that lubricant can be bled on its surface. The lubricant is kept in the front surface layer and can be bled constantly on the surface of the front surface layer. Meanwhile, to prevent marked bleeding-out of the lubricant, the viscosity of the lubricant is set to a prescribed value or higher to maintain the ice coated snow adhesion preventive effect as long as possible.

However, in the above configuration, the front surface layer in which the lubricant can be bled has no protection, which causes a problem of insufficient strength. In addition, the lubricant continues bleeding regardless of the temperature, which makes it difficult to prolong the ice coated snow adhesion preventive effect. Also, although there is a concern about excessive bleeding of the lubricant, the bleeding does not necessarily occur smoothly in a case where the preset viscosity of the lubricant is too high. Further, all the lubricant dispersed on the front surface layer can be bled, and as a result of which the lubricant may be bled excessively.

Japanese Patent Laid-Open No. 2003-328308 (Patent Literature 2) discloses a rubber mat that can prevent the accretion of ice/snow. This rubber mat is made of synthetic rubber with a prescribed hardness, and is configured such that under conditions at a temperature of 5° C. or lower, a liquid additive having the effect of preventing an ice/snow from accreting on the surface can be bled. To adjust the bleeding level of the liquid additive, the amount of liquid additive with respect to the rubber in the rubber mat is adjusted to be within a prescribed range.

However, in the above configuration, the rubber mat surface on which the liquid additive can be bled has no protection, which causes a problem of insufficient strength. In the first place, rubber mats are not suitable for outdoor use, etc., where strength is required. With respect to this point, it is preferable in Patent Literature 2 that the liquid additive be used to lower the hardness of the rubber, and thus it is presumed that the strength is not all an issue. In addition, the temperature conditions may be changed to control the level of bleeding of the liquid additive. However, all the liquid additive added to the rubber in the rubber mat can be bled, and as a result of which the liquid additive may be bled excessively.

Japanese Patent No. 6245714 (Patent Literature 3) discloses a wet gel which has anti-adhesion properties against ice and in which spontaneous syneresis can be caused by, for instance, a temperature or chemical reaction. This wet gel comprises: a crosslinked silicone resin in which a silicone resin composition is solidified; a first liquid capable of dissolving the silicone resin composition; and a second liquid capable of being mixed with the first liquid (i.e., when the second liquid and the first liquid are mixed, no phase separation occurs and a transparent mixture is obtained). Provided that the first liquid may be doubled as the second liquid.

Unfortunately, this wet get is not intended for outdoor use, etc., where the strength is required, causing a problem of insufficient strength. In addition, because the first liquid and the second liquid can be mixed and the first liquid may be doubled as the second liquid, the first liquid and the second liquid may be subject to simultaneous or excessive syneresis.

CITATION LIST

Patent Literature

Patent Literature 1: Japanese Patent Laid-Open No. 07-148879
Patent Literature 2: Japanese Patent Laid-Open No. 2003-328308
Patent Literature 3: Japanese Patent No. 6245714

SUMMARY OF INVENTION

Technical Problem

The present invention addresses these problems in the conventional art. The purpose of the present invention is to provide a sheet body having an improved function of preventing icing and/or snow accretion.

Solution to Problem

To solve the above problems, an aspect of the present invention provides a sheet body including at least a solid oil-containing resin layer containing an oil and an oil-permeable surface resin layer that has higher wear resistance than the oil-containing resin layer and is layered on one of surfaces of the oil-containing resin layer, wherein the oil included in the oil-containing resin layer includes a low-temperature exuding oil component capable of exuding from the oil-containing resin layer when a temperature decreases to a predetermined value or lower, and the surface resin layer has enough oil permeability to permeate the low-temperature exuding oil component exuding from the oil-containing resin layer to a surface of the surface resin layer that is opposite to a side of the oil-containing resin layer. Here, the predetermined value may be the freezing point.

The sheet body provided in this aspect is a sheet body including a surface protective layer that protects the oil-containing resin layer into which the oil component exudes. In addition, this oil component is a low-temperature exuding oil component that can exude when the temperature decreases to a predetermined value or lower. This causes no useless bleeding and causes bleeding when needed, thereby capable of reliably preventing, for instance, ice/snow accretion. Further, since this oil component is part of oil components included in the oil-containing resin layer, excessive bleeding of the oil component hardly occurs.

Preferably, the oil included in the oil-containing resin layer in the sheet body of the above aspect is miscible at room temperature with the resin component in the oil-containing resin layer and contains a low-temperature phase-separable oil component that can be phase-separated from the resin component in the oil-containing resin layer under an environment at a temperature of the predetermined value or lower.

Preferably, the oil included in the oil-containing resin layer in the sheet body of the above aspect includes a first oil component and a second oil component; a difference between a solubility parameter value (SP value) for the resin component in the oil-containing resin layer and a solubility parameter value for the first oil component is smaller than a difference between a solubility parameter value (SP value) for the resin component in the oil-containing resin layer and a solubility parameter value for the second oil component; and the second oil component constitutes the low-temperature phase-separable oil component.

Also, preferably, the oil-containing resin layer in the sheet body of the above aspect includes the resin component in a proportion of 25 wt % or more based on the total weight of the oil-containing resin layer under the temperature environment where the second oil component is not phase-separated.

Further, the surface resin layer in the sheet body of the above aspect preferably has a thickness of 750 μm or less.

Furthermore, it is preferable in the sheet body of the above aspect that the resin component is a crosslinked silicone resin and the first and second oil components are silicone oil.

Moreover, the sheet body of the above aspect further optionally includes a base material provided on the other surface of the oil-containing resin layer that is opposite to the one surface.

Meanwhile, in the sheet body of the above aspect, the base material may be used to form an oil-impermeable resin layer that is impermeable to the oil.

The sheet body of the above aspect may further include: an adhesive layer provided on a surface of the base material that is opposite to the surface on which the oil-containing resin layer is provided; and a separator detachably attached to an outside surface of the adhesive layer.

The sheet body of the above aspect further optionally includes: an adhesive layer provided on the other surface that is opposite to the one surface of the oil-containing resin layer; and a separator detachably attached to an outside surface of the adhesive layer.

In the sheet body of the above aspect, an oil-impermeable resin layer that is impermeable to the oil may be interposed between the oil-containing resin layer and the adhesive layer. Alternatively, the adhesive layer may be used to form an oil-impermeable resin layer that is impermeable to the oil.

Preferably, in the sheet body of the above aspect, the surface resin layer has a reduction rate of less than 80% when the reduction rate is determined by using #120-mesh sandpaper and reciprocating the sandpaper on the sheet body 100 times at a speed of 100 mm/s under pressure applied at 125 g/cm².

In the sheet body of the above aspect, the first oil component and the second oil component are preferably phase-separated at a temperature of the predetermined value or lower.

In the sheet body of the above aspect, the surface oil level at −20° C. is preferably 40 μg/cm² or higher.

In the sheet body of the above aspect, a difference in solubility parameter between the first oil component and the resin component is preferably within 0.6 $(J/cm^3)^{1/2}$.

To solve the above problems, another aspect of the present invention provides a sheet body including at least a solid oil-containing resin layer including a first oil component and a second oil component, wherein the second oil component constitutes a low-temperature phase-separable oil component that may be phase-separate from the first oil component to exude from the oil-containing resin layer when a temperature decreases to a predetermined value or lower.

According to the sheet body of this another aspect, the oil component exuding from the oil-containing resin layer is an oil component that can exude through phase separation when the temperature decreases to the predetermined value or lower. This causes no useless bleeding and causes bleeding when needed, thereby capable of reliably preventing, for instance, ice/snow accretion. Further, since this oil component is part of oil components included in the oil-containing resin layer, excessive bleeding of the oil component hardly occurs.

The sheet body of the above aspect preferably further includes an oil-permeable surface resin layer that is layered on one of surfaces of the oil-containing resin layer and has higher wear resistance than the oil-containing resin layer, wherein the surface resin layer has enough oil permeability to permeate a low-temperature exuding oil component exuding from the oil-containing resin layer to a surface of the surface resin layer that is opposite to a side of the oil-containing resin layer.

In the sheet body of the above aspect, the predetermined value may be the freezing point.

Advantageous Effects of Invention

The present invention can provide a sheet body having an improved function of preventing icing and/or snow accretion and also provide a sheet body having enough strength to endure, for instance, outdoor use.

DESCRIPTION OF EMBODIMENTS

Hereinafter, preferred embodiments of the present invention will be described with reference to the drawings attached. For description convenience, just preferred embodiments will be shown. Of course, the present invention is not limited to them.

1. Structure of Sheet Body

Figure 1:
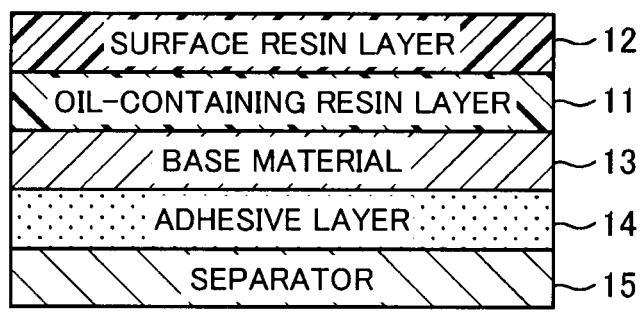
FIG. 1 is a diagram illustrating the layer structure of a sheet body according to an embodiment of the present invention.

FIG. 1 shows the layer structure of a sheet body 1 according to an embodiment of the present invention. The sheet body 1 includes at least an oil-containing resin layer 11 and a surface resin layer 12 layered on one of surfaces of the oil-containing resin layer 11. The sheet body 1 further may include: for, instance, a base material 13 provided on the other surface that is opposite to the one surface of the oil-containing resin layer 11; an adhesive layer 14 provided on a surface of the base material 13 that is opposite to the surface on which the oil-containing resin layer 11 is provided; and a separator 15 detachably attached to an outside surface of the adhesive layer 14. The separator 15 is peeled off upon use to expose the adhesive 14, which can be attached to various structures (not shown).

(1) Oil-Containing Resin Layer

The oil-containing resin layer 11 contains an oil component, such as first and second oil components, and a resin component, and is a solid resin layer in which part of included oils, for instance, the second oil component can exude (bleed) from the resin component, thereby preventing icing and/or snow accretion by using the oil component exuded.

The layer thickness of the oil-containing resin layer 11 is not particularly limited, and preferably 10000 μm or less, more preferably 5000 μm or less, still more preferably 2500 μm or less, and particularly preferably 2000 μm or less in order to cause appropriate oil exuding. Here, in view of strength, the layer thickness is preferably 10 μm or more, more preferably 50 μm or more, still more preferably 100 μm or more, and particularly preferably 200 μm or more.

<Resin Component in Oil-Containing Resin Layer>

Examples of the resin component in the oil-containing resin layer 11 include, but are not particularly limited to, silicone resin, polyurethane resin, polyurethane acrylic resin, vinyl chloride resin, polyester resin, elastomers, fluororesin, polyamide resin, polyolefin resin (e.g., polyethylene, polypropylene), or acrylic resin. From the viewpoint of an oil component bleeding effect and excellent outdoor exposure durability, preferred is a crosslinked silicone resin among them.

As the silicone resin, any suitable silicone resin is acceptable as long as the effects of the present invention are not impaired. Just one type of silicone resin may be used, or two or more types of silicone resin may be used. Such a silicone resin may be a condensed silicone resin or an addition-type silicone resin. In addition, such a silicone resin may be a one-component silicone resin to be dried alone (e.g., a one-component room-temperature vulcanizing (RTV) resin) or a two-component silicone resin (e.g., a two-component room-temperature vulcanizing (RTV) resin).

Examples of the silicone resin that can be used include: one-component RTV rubber, manufactured by Shin-Etsu Chemical Co., Ltd., (e.g., KE-3423, KE-347, KE-3475, KE-3495, KE-4895, KE-4896, KE-1830, KE-1884, KE-3479, KE-348, KE-4897, KE-4898, KE-1820, KE-1825, KE-1831, KE-1833, KE-1885, KE-1056, KE-1151, KE-1842, KE-1886, KE-3424G, KE-3494, KE-3490, KE-40RTV, KE-4890, KE-3497, KE-3498, KE-3493, KE-3466, KE-3467, KE-1862, KE-1867, KE-3491, KE-3492, KE-3417, KE-3418, KE-3427, KE-3428, KE-41, KE-42, KE-44, KE-45, KE-441, KE-445, KE-455); two-component RTV rubber, manufactured by Shin-Etsu Chemical Co., Ltd., (e.g., KE-1800T-A/B, KE-66, KE-1031-A/B, KE-200, KE-118, KE-103, KE-108, KE-119, KE-109E-A/B, KE-1051J-A/B, KE-1012-A/B, KE-106, KE-1282-A/B, KE-1283-A/B, KE-1800-A/B/C, KE-1801-A/B/C, KE-1802-A/B/C, KE-1281-A/B, KE-1204-A/B, KE-1204-AL/BL, KE-1280-A/B, KE-513-A/B, KE-521-A/B, KE-1285-A/B, KE-1861-A/B, KE-12, KE-14, KE-17, KE-113, KE-24, KE-26, KE-1414, KE-1415, KE-1416, KE-1417, KE-1300T, KE-1310ST, KE-1314-2, KE-1316, KE-1600, KE-1603-A/B, KE-1606, KE-1222-A/B, KE-1241); a silicone sealant, manufactured by Shin-Etsu Chemical Co., Ltd., (e.g., KE-42AS, KE-420, KE-450); a rubber compound, manufactured by Shin-Etsu Chemical Co., Ltd., (e.g., KE-655-U, KE-675-U, KE-931-U, KE-941-U, KE-951-U, KE-961-U, KE-971-U, KE-981-U, KE-961T-U, KE-971T-U, KE-871C-U, KE-9410-U, KE-9510-U, KE-9610-U, KE-9710-U, KE-742-U, KE-752-U, KE-762-U, KE-772-U, KE-782-U, KE-850-U, KE-870-U, KE-880-U, KE-890-U, KE-9590-U, KE-5590-U, KE-552-U, KE-582-U, KE-552B-U, KE-555-U, KE-575-U, KE-541-U, KE-551-U, KE-561-U, KE-571-U, KE-581-U, KE-520-U, KE-530B-2-U, KE-540B-2-U, KE-1551-U, KE-1571-U, KE-152-U, KE-174-U, KE-3601SB-U, KE-3711-U, KE-3801M-U, KE-5612G-U, KE-5620BL-U, KE-5620 W-U, KE-5634-U, KE-7511-U, KE-7611-U, KE-765-U, KE-785-U, KE-7008-U, KE-7005-U, KE-503-U, KE-5042-U, KE-505-U, KE-6801-U, KE-136Y-U); LIMS (liquid silicone rubber injection molding system), manufactured by Shin-Etsu Chemical Co., Ltd., (e.g., KEG-2000-40A/B, KEG-2000-50A/B, KEG-2000-60A/B, KEG-2000-70A/B, KEG-2001-40A/B, KEG-2001-50A/B, KE-1950-10A/B, KE-1950-20A/B, KE-1950-30A/B, KE-1950-35A/B, KE-1950-40A/B, KE-1950-50A/B, KE-1950-60A/B, KE-1950-70A/B, KE-1935A/B, KE-1987A/B, KE-1988A/B, KE-2019-40A/B, KE-2019-50A/B, KE-2019-60A/B, KE-2017-30A/B, KE-2017-40A/B, KE-2017-50A/B, KE-2090-40A/B, KE-2090-50A/B, KE-2090-60A/B, KE-2090-70A/B, KE-2096-40A/B, KE-2096-50A/B, KE-2096-60A/B); a LR7665 series, manufactured by Wacker Asahikasei Silicone Co., Ltd.; a LR3033 series, manufactured by Wacker Asahikasei Silicone Co., Ltd.; a TSE3032 series and others, manufactured by Momentive Performance Materials Inc.; or Sylgard 184 and others, manufactured by Dow Corning Toray Co., Ltd.

<Oil Component>

The oil-containing resin layer 11 may contain, for instance, two oil components, namely a first oil component and a second oil component.

Examples of the first oil component that can be used include silicone oil, fluorine oil, hydrocarbon-based oil, polyether-based oil, ester-based oil, phosphorus compound-based oil, or mineral oil-based oil.

Examples of the silicone oil that can be used include: silicone oil, manufactured by Shin-Etsu Chemical Co., Ltd., (e.g., KF96L series, KF96 series, KF69 series, KF99 series, KF50 series, KF54 series, KF410 series, KF412 series, KF414 series, FL series, KF-6000, KF-6001, KF-6002, KF-6003); silicone oil, manufactured by Momentive Performance Materials Inc., (e.g., Element14*PDMS series, TSF404 series, TSF410 series, TSF4300 series, TSF431 series, TSF433 series, TSF437 series, TSF4420 series, TSF4421 series); silicone oil, manufactured by Dow Corning Toray Co., Ltd., (e.g., BY16-846 series, SF8416 series, SF8427 series, SF-8428 series, SH200 series, SH203 series, SH230 series, SF8419 series, FS1265 series, SH510 series, SH550 series, SH710 series, FZ-2110 series, FZ-2203 series, BY16-201); or silicone oil, manufactured by Wacker Asahikasei Silicone Co., Ltd., (e.g., WACKER (registered trademark) SILICONE FLUID AK series, WACKER (registered trademark) SILICONE FLUID AP series, WACKER (registered trademark) SILICONE FLUID AR series, WACKER (registered trademark) SILICONE FLUID AS series, WACKER (registered trademark) TN series, WACKER (registered trademark) L series, WACKER (registered trademark) AF series).

Meanwhile, examples of the second oil component that can be used include silicone oil, fluorine oil, hydrocarbon-based oil, polyether-based oil, ester-based oil, phosphorus compound-based oil, or mineral oil-based oil.

Examples of the silicone oil that can be used include: silicone oil, manufactured by Shin-Etsu Chemical Co., Ltd., (e.g., KF96L series, KF96 series, KF69 series, KF99 series, KF50 series, KF54 series, KF410 series, KF412 series, KF414 series, FL series, KF-6000, KF-6001, KF-6002, KF-6003); silicone oil, manufactured by Momentive Performance Materials Inc., (e.g., Element14*PDMS series, TSF404 series, TSF410 series, TSF4300 series, TSF431 series, TSF433 series, TSF437 series, TSF4420 series, TSF4421 series); silicone oil, manufactured by Dow Corning Toray Co., Ltd., (e.g., BY16-846 series, SF8416 series, SF8427 series, SF-8428 series, SH200 series, SH203 series, SH230 series, SF8419 series, FS1265 series, SH510 series, SH550 series, SH710 series, FZ-2110 series, FZ-2203 series, BY16-201); or silicone oil, manufactured by Wacker Asahikasei Silicone Co., Ltd., (e.g., WACKER (registered trademark) SILICONE FLUID AK series, WACKER (registered trademark) SILICONE FLUID AP series, WACKER (registered trademark) SILICONE FLUID AR series, WACKER (registered trademark) SILICONE FLUID AS series, WACKER (registered trademark) TN series, WACKER (registered trademark) L series, WACKER (registered trademark) AF series).

A combination of the first oil component, the second oil component, and the resin component in the oil-containing resin layer 11 is selected to satisfy, for instance, the following characteristics 1) and 2).

1) The first oil component and the second oil component are not phase-separated and compatible at a temperature at which the second oil component is not required to bleed into the surface resin layer 12, for example, at an ordinary temperature of about 20° C. to 80° C. which is significantly higher than a predetermined value such as the freezing point; and they are phase-separated under an environment at a temperature at which the second oil component is required to bleed into the surface resin layer 12, for example, at a predetermined temperature (e.g., the freezing point) or lower.

2) The first oil component is miscible with the resin component of the oil-containing resin layer 11 both at a temperature at which the second oil component is not required to bleed into the surface resin layer 12 and at a temperature at which the second oil component is required to bleed into the surface resin layer 12; and by contrast, the second oil component changes behavior in the presence of the first oil component, depending on the temperature at which the second oil component is not required to bleed into the surface resin layer 12 or the temperature at which the second oil component is required to bleed into the surface resin layer 12.

More specifically, without the first oil component, the second oil component is immiscible with the resin component of the oil-containing resin layer 11 both at a temperature at which the second oil component is not required to bleed into the surface resin layer 12 and at a temperature at which the second oil component is required to bleed into the surface resin layer 12. In other words, the second oil component exudes from the resin component of the oil-containing resin layer 11. Meanwhile, in the presence of the first oil component, the second oil component is compatible with the first oil component at a temperature at which the second oil component is not required to bleed into the surface resin layer 12. Thus, the second oil component is miscible with the resin component in the oil-containing resin layer 11. In other words, the second oil component does not exude therefrom. By contrast, the second oil component is immiscible with the resin component of the oil-containing resin layer 11 because phase-separated from the first oil component at a temperature at which the second oil component is required to bleed into the surface resin layer 12. In other words, the second oil component functions as a low-temperature phase-separable oil component that can be phase-separated from the first oil component.

The solubility parameter value is empirically known to be an indicator to determine how easily a solvent and a solute are mixed. The relationship among the first oil component, the second oil component, and the resin component of the oil-containing resin layer 11 as described above can also be explained based on the relationship among each solubility parameter value (SP value). As used herein, a Hansen solubility parameter as the solubility parameter. This value can be determined by subjecting the first oil component, the second oil component, and the resin component of the oil-containing resin layer 11 to Fourier transform nuclear magnetic resonance spectrometry, examining the type of molecular unit constituting the molecular structure of each component and their molar ratio, and calculating a Hansen solubility parameter for each molecular unit type as weight-averaged using the molar ratio. The Hansen solubility parameter for each molecular unit type can be determined by the molecular group contribution method using software "HSPiP, Hansen Solubility Parameters in Practice ver4" available in the link (https://hansen-solubility.com/). Specifically, each constituent unit in a substance of interest is input using the SMILES notation, and the HSP values ($\delta_d$, $\delta_p$, $\delta_h$) for each unit can be calculated.

To keep the relationship between the above characteristics 1) and 2), the difference between the solubility parameter value for the resin component in the oil-containing resin layer 11 and the solubility parameter value for the first oil component is preferably set to be at least smaller than the difference between the solubility parameter value for the resin component in the oil-containing resin layer 11 and the solubility parameter value for the second oil component. In addition, to keep the relationship between the above characteristics 1) and 2), the oil-containing resin layer 11 contains, for instance, the resin component in a proportion of at least 25 wt % or more, the first oil component in a proportion of at least 5 wt % or more, and the second oil component in a proportion of at least 3 wt % or more based on the total weight of the oil-containing resin layer, under an environment at a temperature at which the first oil component and the second oil component are not phase-separated. Further, the difference in solubility parameter between the first oil component and the resin component of the oil-containing resin layer 11 is preferably set to be within 0.6 $(J/cm^3)^{1/2}$.

More specifically, the weight of the resin component in the oil-containing resin layer 11 based on the total weight of the finally formed oil-containing resin layer is preferably 30 wt % or higher, more preferably 35 wt % or higher, and still more preferably 40 wt % or higher. The upper limit is not particularly limited and set, if appropriate, in view of the oil component, and may be, for instance, 70 wt % or lower.

In addition, the weight of the first oil component based on the total weight of the finally formed oil-containing resin layer may be set to be, for instance, 10 wt % or higher, 15 wt % or higher, or 20 wt % or higher. The upper limit is not particularly limited and may be set to be preferably 65 wt % or lower, such as 50 wt % or lower, 40 wt % or lower, 30 wt % or lower, or 20 wt % or lower.

In addition, the weight of the second oil component based on the total weight of the finally formed oil-containing resin layer is preferably 5 wt % or higher, more preferably 10 wt % or higher, and still more preferably 15 wt % or higher. The upper limit is not particularly limited and may be set to be preferably 62 wt % or lower, such as 60 wt % or lower, 50 wt % or lower, 40 wt % or lower, or 30 wt % or lower.

If the relationship between above 1) and 2) is met, for instance, the second oil component is compatible with the first oil component at a temperature at which the second oil component is not required to bleed into the surface resin layer 12, so that the second oil component does not bleed from the surface of the oil-containing resin layer 11. By contrast, if the temperature is changed to a temperature at which the second oil component is required to bleed into the surface resin layer 12, the second oil component is phase-separated from the first oil component and then exudes from a surface of the oil-containing resin layer 11 on the side of the surface resin layer 12, and can thus function as a low-temperature exuding oil component that can be bled from the surface resin layer 12.

As clear from the above description, the first oil component and the second oil component do not have to be distinguishable as a substance and suffice if they can be distinguished from each other from the aspects of the above described functions and actions. Hence, the first oil component and the second oil component do not have to be each included as one oil component. If the above relationship is met, each of the first and second oil components may contain a plurality of oil components.

(2) Surface Resin Layer

The surface resin layer 12 aims at protecting the surface of the oil-containing resin layer 11, is a solid resin layer provided while layered on one of surfaces of the oil-containing resin layer 11, and contains at least a resin component. The surface resin layer 12 further may contain an oil component, like the oil-containing resin layer.

The layer thickness of the surface resin layer 12 is not particularly limited, and, in order to make the oil permeate easily to the surface of the surface resin layer 12, in other words, in order to secure oil permeability of the surface resin layer 12, is preferably 750 μm or less and, from the viewpoint of strength, preferably 50 μm or more.

<Resin Component in Surface Resin Layer>

In order to protect the surface of the oil-containing resin layer 11, the surface resin layer 12 preferably has higher wear resistance than the oil-containing resin layer 11.

Although covering the oil-containing resin layer 11, the surface resin layer 12 is required to have enough oil permeability to permeate the second oil component exuding from the oil-containing resin layer 11 to a surface of the surface resin layer 12 that is opposite to a side of the oil-containing resin layer 11 so as not to hinder the function of preventing icing and/or snow accretion through the oil stored in the oil-containing resin layer.

Examples of material for the resin component in the surface resin layer 12 that satisfies the above requirements include, but are not particularly limited to, silicone resin, polyurethane resin, polyurethane acrylic resin, vinyl chloride resin, polyester resin, elastomers, fluororesin, polyamide resin, polyolefin resin (e.g., polyethylene, polypropylene), or acrylic resin. From the viewpoint of an oil component bleeding effect and excellent outdoor exposure durability, a crosslinked silicone resin is preferred among them.

As the silicone resin, any suitable silicone resin is acceptable as long as the effects of the present invention are not impaired. Just one type silicone resin may be used, or two or more types of silicone resin may be used. Such a silicone resin may be a condensed silicone resin or an addition-type silicone resin. In addition, such a silicone resin may be a one-component silicone resin to be dried alone (e.g., a one-component room-temperature vulcanizing (RTV) resin) or a two-component silicone resin (e.g., a two-component room-temperature vulcanizing (RTV) resin).

Examples of the silicone resin that can be used include: one-component RTV rubber, manufactured by Shin-Etsu Chemical Co., Ltd., (e.g., KE-3423, KE-347, KE-3475, KE-3495, KE-4895, KE-4896, KE-1830, KE-1884, KE-3479, KE-348, KE-4897, KE-4898, KE-1820, KE-1825, KE-1831, KE-1833, KE-1885, KE-1056, KE-1151, KE-1842, KE-1886, KE-3424G, KE-3494, KE-3490, KE-40RTV, KE-4890, KE-3497, KE-3498, KE-3493, KE-3466, KE-3467, KE-1862, KE-1867, KE-3491, KE-3492, KE-3417, KE-3418, KE-3427, KE-3428, KE-41, KE-42, KE-44, KE-45, KE-441, KE-445, KE-455); two-component RTV rubber, manufactured by Shin-Etsu Chemical Co., Ltd., (e.g., KE-1800T-A/B, KE-66, KE-1031-A/B, KE-200, KE-118, KE-103, KE-108, KE-119, KE-109E-A/B, KE-1051J-A/B, KE-1012-A/B, KE-106, KE-1282-A/B, KE-1283-A/B, KE-1800-A/B/C, KE-1801-A/B/C, KE-1802-A/B/C, KE-1281-A/B, KE-1204-A/B, KE-1204-AL/BL, KE-1280-A/B, KE-513-A/B, KE-521-A/B, KE-1285-A/B, KE-1861-A/B, KE-12, KE-14, KE-17, KE-113, KE-24, KE-26, KE-1414, KE-1415, KE-1416, KE-1417, KE-1300T, KE-1310ST, KE-1314-2, KE-1316, KE-1600, KE-1603-A/B, KE-1606, KE-1222-A/B, KE-1241); a silicone sealant, manufactured by Shin-Etsu Chemical Co., Ltd., (e.g., KE-42AS, KE-420, KE-450); a rubber compound, manufactured by Shin-Etsu Chemical Co., Ltd., (e.g., KE-655-U, KE-675-U, KE-931-U, KE-941-U, KE-951-U, KE-961-U, KE-971-U, KE-981-U, KE-961T-U, KE-971T-U, KE-871C-U, KE-9410-U, KE-9510-U, KE-9610-U, KE-9710-U, KE-742-U, KE-752-U, KE-762-U, KE-772-U, KE-782-U, KE-850-U, KE-870-U, KE-880-U, KE-890-U, KE-9590-U, KE-5590-U, KE-552-U, KE-582-U, KE-552B-U, KE-555-U, KE-575-U, KE-541-U, KE-551-U, KE-561-U, KE-571-U, KE-581-U, KE-520-U, KE-530B-2-U, KE-540B-2-U, KE-1551-U, KE-1571-U, KE-152-U, KE-174-U, KE-3601SB-U, KE-3711-U, KE-3801M-U, KE-5612G-U, KE-5620BL-U, KE-5620 W-U, KE-5634-U, KE-7511-U, KE-7611-U, KE-765-U, KE-785-U, KE-7008-U, KE-7005-U, KE-503-U, KE-5042-U, KE-505-U, KE-6801-U, KE-136 Y-U); LIMS (liquid silicone rubber injection molding system), manufactured by Shin-Etsu Chemical Co., Ltd., (e.g., KEG-2000-40A/B, KEG-2000-50A/B, KEG-2000-60A/B, KEG-2000-70A/B, KEG-2001-40A/B, KEG-2001-50A/B, KE-1950-10A/B, KE-1950-20A/B, KE-1950-30A/B, KE-1950-35A/B, KE-1950-40A/B, KE-1950-50A/B, KE-1950-60A/B, KE-1950-70A/B, KE-1935A/B, KE-1987A/B, KE-1988A/B, KE-2019-40A/B, KE-2019-50A/B, KE-2019-60A/B, KE-2017-30A/B, KE-2017-40A/B, KE-2017-50A/B, KE-2090-40A/B, KE-2090-50A/B, KE-2090-60A/B, KE-2090-70A/B, KE-2096-40A/B, KE-2096-50A/B, KE-2096-60A/B); a LR7665 series, manufactured by Wacker Asahikasei Silicone Co., Ltd.; a LR3033 series, manufactured by Wacker Asahikasei Silicone Co., Ltd.; a TSE3032 series and others, manufactured by Momentive Performance Materials Inc.; or Sylgard 184 and others, manufactured by Dow Corning Toray Co., Ltd.

Note that the material for the resin component in the surface resin layer 12 may be the same as that in the oil-containing resin layer 11. In order to increase wear resistance, however, the proportion of the resin component included in the surface resin layer 12 is preferably set to be significantly larger than the proportion in the oil-containing resin layer 11.

(3) Base Material

The base material 13 is used to secure the strength of the sheet body 1 by supporting, for instance, the oil-containing resin layer 11 and to make it easy to handle the sheet body 1.

Examples of the base material 13 that can be used include, but are not particularly limited to, polyurethane resin, polyurethane acrylic resin, rubber-based resin, vinyl chloride resin, polyester resin, silicone resin, elastomers, fluororesin, polyamide resin, polyolefin resin (e.g., polyethylene, polypropylene), or a metal plate or metal foil (e.g., aluminum, copper, silver, iron, nickel, tin, stainless steel).

To prevent a discharge of the oil component from the oil-containing resin layer 11, the base material 13 is preferably formed as an oil-impermeable resin layer that is impermeable to the oil. Examples of the oil-impermeable base material that can be used include, but are not particularly limited to, polyurethane resin, polyurethane acrylic resin, rubber-based resin, vinyl chloride resin, polyester resin, silicone resin, elastomers, fluororesin, polyamide resin, or polyolefin resin (e.g., polyethylene, polypropylene).

(4) Adhesive Layer

The adhesive layer 14 is used to adhere, for instance, the oil-containing resin layer 11 to a variety of objects to be attached.

Examples of the material for the adhesive layer 14 that can be used include, but are not particularly limited to, an acrylic resin-based adhesive, epoxy resin-based adhesive, amino resin-based adhesive, vinyl resin (e.g., vinyl acetate polymer)-based adhesive, curable acrylic resin-based adhesive, or silicone resin-based adhesive.

To prevent a discharge of the oil component from the oil-containing resin layer 11, the adhesive layer 14, instead of the oil-impermeable base material 13 or together with the oil-impermeable base material 13, may be used to form an oil-impermeable resin layer that is impermeable to the oil. Examples of the material for the oil-impermeable adhesive material layer that can be used include, but are not particularly limited to, an acrylic resin-based adhesive, epoxy resin-based adhesive, amino resin-based adhesive, vinyl resin (e.g., vinyl acetate polymer)-based adhesive, curable acrylic resin-based adhesive, or silicone resin-based adhesive.

Figure 2:
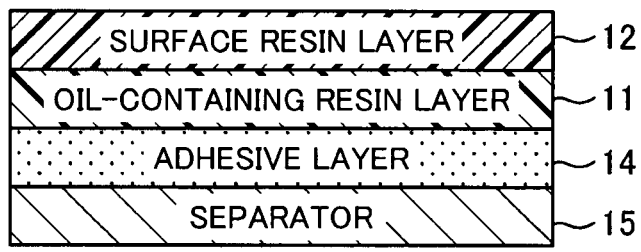
FIG. 2 is a diagram illustrating the layer structure of the sheet body without a base material.

If the adhesive layer is used to form the oil-impermeable resin layer, the base material 13 is not necessarily impermeable to the oil. Thus, if no problem of, for instance, strength occurs, the base material 13 may be omitted as shown in FIG. 2. In this case, the adhesive layer 14 is provided on the other surface opposite to the one surface of the oil-containing resin layer 11.

Figure 3:
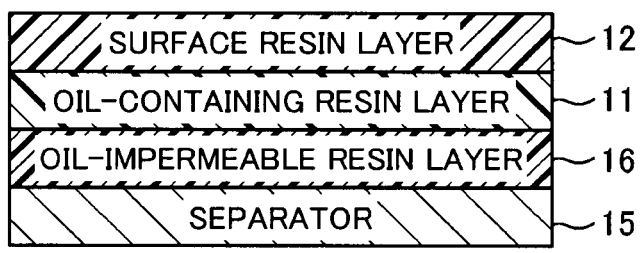
FIG. 3 is a diagram illustrating the layer structure of the sheet body provided with an oil-impermeable resin layer instead of a base material and an adhesive layer.
Figure 4:
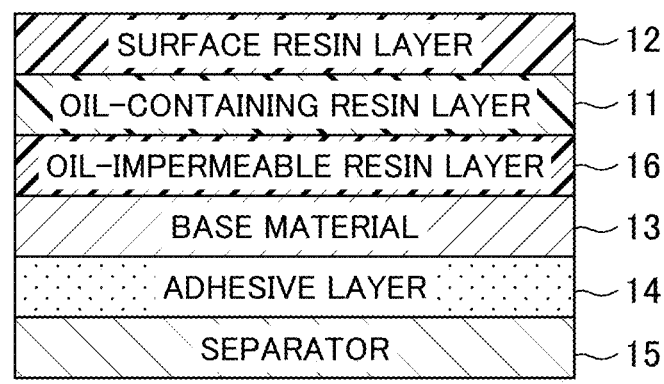
FIG. 4 is a diagram illustrating the layer structure of the sheet body further provided with an oil-impermeable resin layer.

In addition, instead of the base material 13 and the adhesive material layer 14 as shown in FIG. 3 or together with them as shown in FIG. 4, an oil-impermeable resin layer 16 that is impermeable to the oil may be further provided between the oil-containing resin layer 11 and the base material 13. Although not depicted, an oil-impermeable resin layer 16 may be arranged between the base material 13 and the adhesive 14 in FIG. 4. The material for the oil-impermeable resin layer 16 is not particularly limited, and substantially the same material for the oil-impermeable base material 13 may be used.

Note that the adhesive layer 14 is provided to adhere, for instance, the oil-containing resin layer 11 to a variety of objects to be attached. Thus, an adhesive tape, for instance, may be, of course, used instead of the adhesive layer 14.

(5) Separator

The separator 15 may be suitably selected in accordance with, for instance, the material for the adhesive layer 14. Examples of the separator 15 that can be used include, but are not particularly limited to, polyurethane resin, polyurethane acrylic resin, rubber-based resin, vinyl chloride resin, polyester resin, silicone resin, elastomers, fluororesin, polyamide resin, or polyolefin resin (e.g., polyethylene, polypropylene).

(6) Production of Sheet Body

A layered body including the oil-containing resin layer 11 and the surface resin layer 12 may be manufactured, without limitation, by producing the oil-containing resin layer 11 using, for instance, a resin component and an oil component and then producing, on this oil-containing resin layer 11, the surface resin layer 12 using a resin component and an oil component.

Next, the layered body including the oil-containing resin layer 11 and the surface resin layer 12 is provided with the base material 13, the adhesive layer 14, and the separator 14, using a conventionally known step(s). The base material 13 is bonded, using, for instance, an adhesive, to a surface of the oil-containing resin layer 11 that is opposite to a side of the surface resin layer 12. The adhesive layer 14 is attached to a surface of the base material 13 that is opposite to a side of the oil-containing resin layer 11. After that, the separator 14 is attached to the outside surface of the adhesive layer 14 in a detachable state.

2. EXAMPLES

Hereinbelow, the present invention will be described in more detail with reference to Examples. However, the present invention is not limited to the following Examples.

Example 1

Each sheet body was obtained by the following procedure.

1) Production of Oil-Containing Resin Layer

First, a Sylgard 184 main agent (manufactured by Dow Corning Toray Co., Ltd.) as a resin component, a Sylgard 184 curing agent (manufactured by Dow Corning Toray Co., Ltd.) also as a resin component, dimethyl siloxane oil (product #KF-96 100 cs, manufactured by Shin-Etsu Chemical Co., Ltd. Silicone Division) as the first oil component, and methylphenyl siloxane oil (TSF437 manufactured by Momentive Performance Materials Inc.) as the second oil component were mixed at a ratio (weight ratio) of 100:10:210:90. Next, the mixture was poured into a mold and was cured at 100° C. for 30 min in an oven to prepare an oil-containing resin layer primarily having dimethyl polysiloxane rubber containing dimethyl siloxane oil and methylphenyl siloxane oil. The thickness of the oil-containing resin layer was 1000 μm. Here, the solubility parameter value for dimethyl siloxane oil is 11.7 $(J/cm^3)^{1/2}$, the solubility parameter value for methylphenyl siloxane oil is 13.9

$(J/cm^3)^{1/2}$, and, further, the solubility parameter value for dimethyl polysiloxane rubber as the resin component of the oil-containing resin layer is 11.9 $(J/cm^3)^{1/2}$.

2) Production of Surface Resin Layer

Like in the oil-containing resin layer, a Sylgard 184 main agent (manufactured by Dow Corning Toray Co., Ltd.) as a resin component, a Sylgard 184 curing agent (manufactured by Dow Corning Toray Co., Ltd.) also as a resin component, dimethyl siloxane oil (product #KF-96 100 cs, manufactured by Shin-Etsu Chemical Co., Ltd. Silicone Division) as the first oil component, and methylphenyl siloxane oil (TSF437 manufactured by Momentive Performance Materials Inc.) as the second oil component were mixed at a ratio (weight ratio) of 100:10:35:15. Next, the resulting mixture was poured onto the oil-containing resin layer in the mold produced in the above 1), and was then cured at 100° C. for 3 h in an oven to form a surface resin layer. The thickness of the surface resin layer was 50 μm.

3) Base Material

A PET film Lumirror S10 #125 (manufactured by Toray Industries, Inc.) was provided, as a base material, on a surface that was of the oil-containing resin layer and was opposite to the side of the surface resin layer. The base material and the oil-containing resin layer were bonded by curing the oil-containing resin layer on the base material. Thus, a bonding step is unnecessary.

4) Other Matters

Neither an adhesive nor a separator was provided. However, because the base material was impermeable to the oil, the oil component should not leak, so that the evaluation of the below-described items should not be affected.

5) Evaluation

The evaluation items were as follows.

<Oil Content>

The oil content in each of the oil-containing resin layer and the surface resin layer was calculated by the formula below. A sample of each of the oil-containing resin layer and the surface resin layer was obtained by scraping off either one layer from the layered body.

Oil Content=W1/W0, wherein W0 is a weight (g) of the oil-containing resin layer or the surface resin layer under an environment at 20° C., obtained by immersing either the oil-containing resin layer or the surface resin layer into toluene (FUJIFILM Wako Pure Chemical Corporation) at 20° C. for 24 h and then by drying at 100° C. for 2 h; and W1 is a weight (g) of the oil-containing resin layer or the surface resin layer under an environment at 20° C., obtained by immersing the above post-drying material into dimethyl silicone oil (trade name "KF-96 100 cs") at 20° C. for 100 h and then by wiping the oil on the surface of each material.

To prevent the second oil component from excessively exuding from the oil-containing resin layer or from excessively bleeding from the surface resin layer, the oil content in the oil-containing resin layer is preferably 2.5 or less. By contrast, to make the second oil component sufficiently exude or bleed, the oil content is preferably 1.5 or higher.

Meanwhile, from the viewpoint of wear resistance, the oil content in the surface resin layer is preferably 2.3 or less. By contrast, to make the second oil component sufficiently bleed, the oil content is preferably 1.2 or higher.

<Layer Thickness and Layer Thickness Ratio>

The layer thickness of each of the oil-containing resin layer and the surface resin layer was measured using a film thickness meter MFC-101 (manufactured by Nikon Corporation).

In addition, the layer thickness ratio was determined by using each layer thickness calculated by the above procedure, based on the following formula.

Layer thickness ratio=Thickness of Surface resin layer/Thickness of Oil-containing resin layer To make the oil component of the oil-containing resin layer sufficiently bleed from the surface resin layer, the layer thickness ratio is preferably 0.75 or lower and more preferably 0.5 or lower. In addition, from the viewpoint of strength, the ratio is preferably 0.05 or higher and more preferably 0.1 or higher. As a result, from the viewpoint of the bleeding oil level and the strength, the film thickness ratio is preferably from 0.05 to 0.75 and more preferably from 0.1 to 0.5.

<Phase Separation and Compatibility, Etc.>

Evaluated were a) phase separation and compatibility between the "first oil component" and the "second oil component" in response to a temperature change; b) miscibility between the "first oil component" and the "resin component in the oil-containing resin layer" in response to a temperature change; and c) miscibility between the "second oil component" and the "resin component in the oil-containing resin layer" in response to a temperature change. It should be noted that a direct analyte was a mixture of the "first oil component" and the "second oil component" extracted from the oil-containing resin layer and the oil component exuding from the surface of the oil-containing resin layer. The oil-containing resin layer was obtained by scraping off the surface resin layer from the layered body having the oil-containing resin layer and the surface resin layer.

To evaluate the above a), the oil-containing resin layer was first immersed into toluene (manufactured by FUJIFILM Wako Pure Chemical Corporation) at 20° C. for 24 h to extract the first oil component and the second oil component as a mixture. The first oil component or the second oil component in the mixture was separated by liquid-phase chromatography. For the extracted first oil component/second oil component mixture, the "transmittance at 20° C. and 500 nm" and the "transmittance at 3° C. and 500 nm" were each measured. Based on the proportion of the difference between the two transmittance values to the "transmittance at 20° C. and 500 nm," whether they were "phase-separated (incompatible)" or "compatible (not phase-separated)" was determined. More specifically, if the difference was 10% or higher, they were evaluated to be "phase-separated (incompatible) in response to a temperature change"; and if the difference was less than 10%, they were evaluated to be "compatible (not phase-separated) in response to a temperature change." The transmittance was measured using a UV/visible spectrophotometer (V-750, manufactured by JASCO Corporation) set at a measurement wavelength of 500 nm, a scanning speed of 1000 nm/min, and a mixing rate of 400 rpm. The sample was set to 20° C. or 3° C., allowed to stand for 10 min, and then measured. The reference used was the air.

The criteria were as follows.
○ . . . 10% or higher
x . . . less than 10%

With regard to the above b) and c), the oil component-containing resin layer containing only one of each oil component in the oil component-extracted oil-containing resin layer was placed under an environment at 20° C. or under an environment at 3° C. Each case was evaluated by determining whether or not the first oil component or the second oil component exuded from the surface of the oil-containing resin layer.

The criteria were as follows.
◯ . . . exuding at any of 20° C. or 3° C.
× . . . no exuding at any of 20° C. or 3° C.

<Surface Oil Level>

Figure 5:
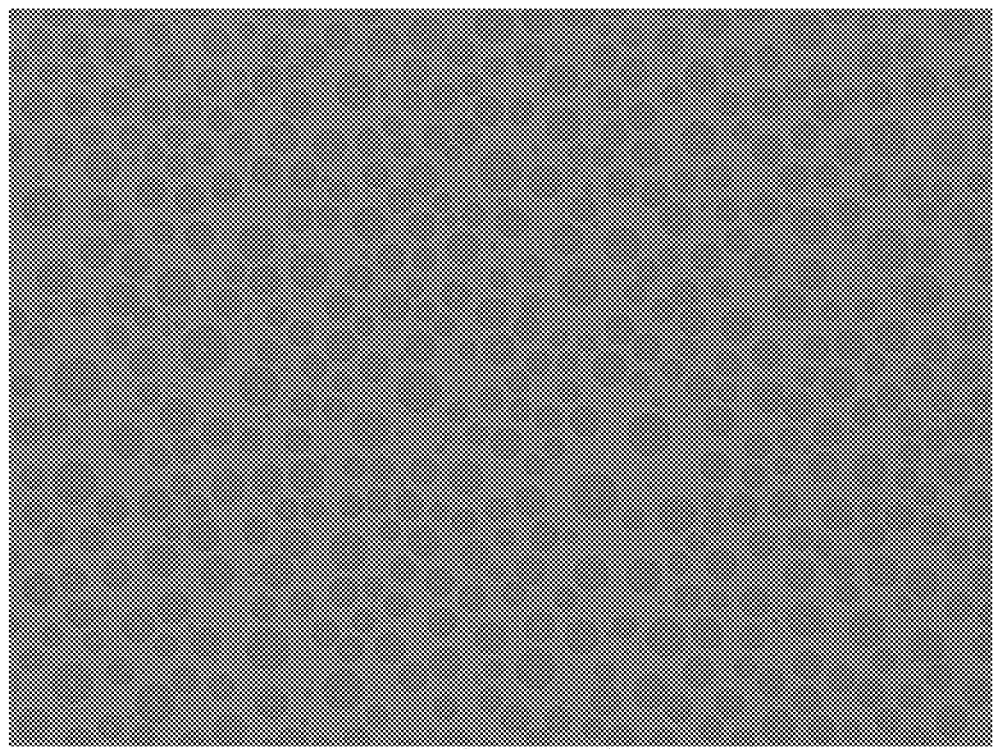
FIG. 5 is a light microscope image obtained by photographing a state of oil appearing on a surface of a surface resin layer.

The measurement subject was the level of oil bleeding onto the surface of the surface resin layer at 20° C., the freezing point 0° C., or −20° C. When measured, the exuding oil was confirmed to be primarily the second oil component. FIG. 5 is an example of light microscope image obtained by photographing a state of oil bleeding on a surface of a surface resin layer. This figure shows a surface oil state when the below-described sheet of Example 7 was cooled using a Peltier element at −20° C. for 1 h under nitrogen purge.

The surface oil level was measured by the following method.

An oil-containing resin layer was cut, at or near the center region of each sheet body, into 10 cm×2 cm size pieces, and the pieces were left for 16 h at a temperature of each of 20° C., 0° C., or −20° C. At this time, the oil bleeding on the surface of the surface resin layer was collected with a cell scraper (CSS-10, manufactured by KENIS, Ltd.) under an environment at a temperature of each of 20° C., 0° C., or −20° C. The oil was absorbed until no change in the weight of oil absorbing paper (oil absorbing level) was observed. The oil collection using the cell scraper and absorption into the oil absorbing paper were repeated 7 times per min. The difference in weight of the oil absorbing paper between before and after the oil absorption was defined as the surface oil level. The test was triplicate, and the average value was calculated.

The criteria were as follows.
◯ . . . from 40 μg/cm$^2$ to less than 300 μg/cm$^2$
× . . . less than 40 μg/cm$^2$ To prevent useless bleeding, the surface oil level is preferably less than 40 μg/cm$^2$ at 20° C. To prevent ice/snow accretion, the surface oil level is preferably 40 μg/cm$^2$ or higher and more preferably 300 μg/cm$^2$ or higher at each of 0° C. or −20° C. In this regard, however, even if the level is 40 μg/cm$^2$ or higher at 20° C. or even if the level is 40 μg/cm$^2$ or lower at 0° C. or −20° C., such values may be acceptable for use.

<Wear Resistance>

The wear resistance of each surface resin layer was evaluated.

Figure 6:
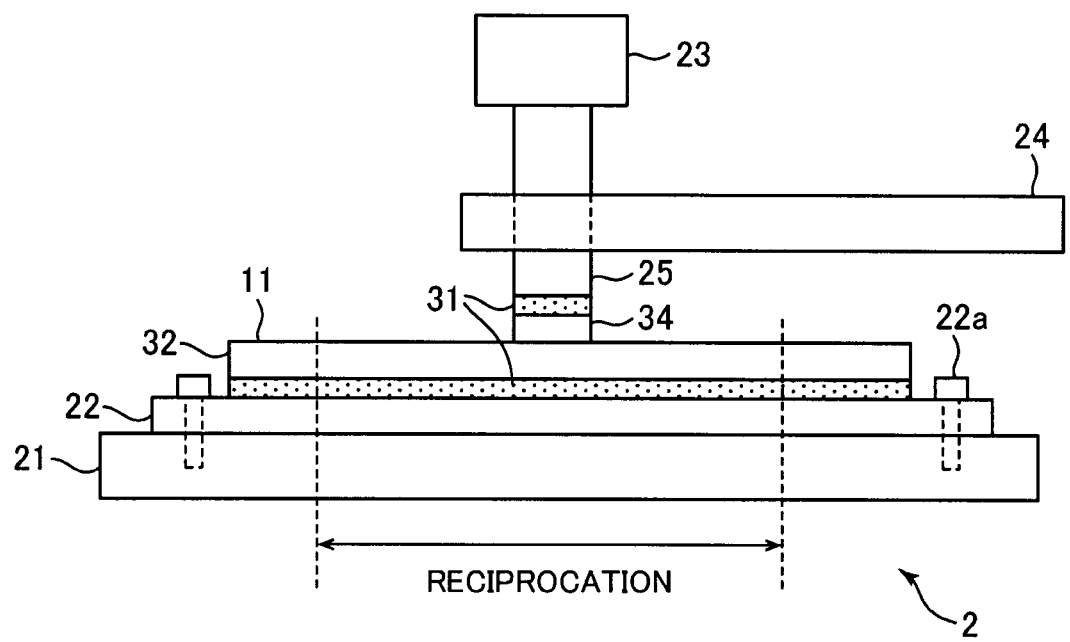
FIG. 6 is a schematic view of a tester used for a wear resistance test.

The measurement device used was a fastness rubbing tester (Model: RT-300S; DAIEI KAGAKU SEIKI MFG. Co., Ltd.). FIG. 6 shows a schematic view of the tester. A tester 2 includes: a test table 21; a support plate 22 fixed to the test table 21 using screws 22a, etc.; and a friction block 25 (with a size of 2 cm×2 cm) disposed above the support body 22 and arranged below a cantilevered load arm 24 onto which a load is applied by a weight 23. Using this tester 2, a reduction rate of each surface resin layer was determined as follows: a test piece 32 of the surface resin layer was attached via an adhesive material 31 (No. 5000NS, manufactured by NITTO DENKO CORPORATION) onto the support plate 22, in particular, a 20 mm×120 mm area thereof; and a #120-mesh water resistant polishing tool 34 attached via the above adhesive 31 to the underside of the friction block 25 was reciprocated 100 times at a speed of 100 mm/s under pressure applied at 125 g/cm$^2$, which was adjusted by the weight 23 and the load arm 24. The room temperature was set to 20° C.

The criteria were as follows.

⊚ . . . less than 10%
◯ . . . from 10% to less than 80%
× . . . 80% or higher

To endure outdoor use, the wear resistance is preferably less than 80%, more preferably less than 50%, and still more preferably less than 20%. In this regard, however, the case of even 80% or higher may be acceptable for use.

<Ice Adhesion Strength>

The measurement subject was force required to move an ice mass attached to the surface resin layer under an environment at −20° C. For convenience, the magnitude of this force was herein defined as "ice adhesion strength."

The ice adhesion strength was measured by the following method.

1. First, a cylindrical ice mass was prepared. The ice mass was prepared by placing a stainless ring (with an inner diameter of 25 mm) on the bottom of a styrene square type case no. 16 (manufactured by AS ONE Corporation), pouring 6 g of pure water into the ring, freezing it at −20° C. for 16 h or longer, and removing the stainless ring after the freezing.
2. Next, a film allowed to stand under an environment at −20° C. for 16 h was attached to a stainless plate provided in parallel to the floor such that the surface resin layer is a superficial layer. Then, the above cylindrical ice mass with an attachment area of 4.9 cm$^2$ was attached.
3. The environment temperature was set to −20° C. At 3 h after the cylindrical ice mass was attached, the ice mass was pushed at a rate of 0.1 mm/s using a load cell (DPU-50, manufactured by IMADA Co., Ltd.; an attachment jig A-type A-4) in a direction parallel to the floor under an environment at −20° C. The load applied during 40 s was measured with a force gage (ZTS-50N, manufactured by IMADA Co., Ltd.), and then the maximum load measured was divided by the attachment area 4.9 cm$^2$ to yield a value, which was recorded as the ice adhesion strength. The test was triplicated, and the average value was calculated.

Note that this measurement method was determined with reference to "Investigation on Technology of Preventing Icing (Part I), Reports of Hokkaido Industrial Research Institute No. 292 (1993)." The ice adhesion strength increases approximately proportionally as the surface oil level increases at least at a temperature of −20° C.

The criteria were as follows.
⊚ . . . less than 0.1 N/cm$^2$
◯ . . . from 0.1 N/cm$^2$ to less than 1.0 N/cm$^2$
× . . . 1.0 N/cm$^2$ or higher The smaller the ice adhesion strength value, the better. If less than 1.0 N/cm$^2$, the value should be sufficient for practical use. In this regard, however, the value of even 1.0 N/cm$^2$ or higher may be acceptable for use.

<Water Resistance>

The water resistance of each oil-containing resin layer was evaluated as follows.

The test device used was a rain tester (manufactured by NISHIYAMA-SEISAKUSHO Co, Ltd.). A test piece of film (size: 150 mm×150 mm) was placed, and the film was subject to rainfall from the above of film in an amount corresponding to the annual precipitation. The annual precipitation was set to 1600 mm in view of the Meteorological Agency data. The test environment temperature was set to an ambient temperature of 5° C. in the tester, a precipitation temperature of 5° C., and a rainfall rate of about 500 mm/h while a rainy day in the winter was simulated.

The first oil component and the second oil component remaining in the test piece of film after the water resistance test were extracted. Then, a change in the ratio between the first oil component and the second oil component was used to calculate a reduction rate of the second oil component between before and after the water resistance test. Here, it has been confirmed that the first component oil does not decrease during the water resistance test.

The method of extracting the first oil and the second oil from the film and the method of calculating the second oil reduction rate are as follows.

1. Each film is cut into a 20 mm×40 mm piece, which is placed in a screw bottle.
2. About 30 g of chloroform is put into the screw bottle, which is then capped.
3. A shaker (a double action lab shaker SRR-2; AS ONE Corporation) is used to shake the bottle at 100 rpm for 15 h. Then, the oil remaining in the film is extracted.
4. A solid remaining in the screw bottle is removed.
5. Chloroform containing the extracted oil is dried in a drier at 100° C. for 2 h to prepare a mixture of the first oil and the second oil.
6. About 3 mg of the resulting mixture of the first oil and the second oil and about 700 mg of deuterated chloroform are collected into a vial to prepare a mixed solution.
7. The mixed solution is transferred to an NMR sample tube.
8. An NMR device (model; ULTRASHIELD 300, manufactured by BRUKER Inc.) is used to measure 1H NMR. Then, the results are assigned to each molecular structure of the second component oil.
9. A change in the H count in Si—$CH_3$ between before and after UV irradiation is used to calculate the reduction rate of the second component oil due to the UV irradiation.

The criteria are as follows.
1 . . . the second component oil reduction rate of less than 10%
2 . . . the second component oil reduction rate of from 10 to less than 30%
3 . . . the second component oil reduction rate of from 30 to less than 50%

Examples 2 to 4 and Reference Examples 1 to 3

Substantially the same procedure as in Example 1 was repeated except that the layer thickness (layer thickness ratio) of the surface resin layer was changed.

Example 5

Substantially the same procedure as in Example 1 was repeated except that the oil content in the surface resin layer was changed.

Examples 6, 7, and 9 to 11 and Reference Example 4

Substantially the same procedure as in Example 5 was repeated except that the layer thickness (layer thickness ratio) of the surface resin layer was changed.

Example 8

Substantially the same procedure as in Example 1 was repeated except that the sheet body was obtained by the following method.

1) To Produce Oil-Containing Resin Layer

First, a Sylgard 184 main agent (manufactured by Dow Corning Toray Co., Ltd.) as a resin component, a Sylgard 184 curing agent (manufactured by Dow Corning Toray Co., Ltd.) also as a resin component, dimethyl siloxane oil (product #KF-96 50 cs, manufactured by Shin-Etsu Chemical Co., Ltd. Silicone Division) as the first oil component, and carbinol-modified siloxane oil (KF-6001, manufactured by Shin-Etsu Chemical Co., Ltd. Silicone Division) as the second oil component were mixed at a ratio (weight ratio) of 100:10:255:45. Next, the mixture was poured into a mold and was cured at 100° C. for 30 min in an oven to prepare an oil-containing resin layer primarily having dimethyl polysiloxane rubber containing dimethyl siloxane oil and methylphenyl siloxane oil. The thickness of the oil-containing resin layer was 1000 μm. Here, the solubility parameter value for the carbinol-modified siloxane oil was 12.2.

2) Production of Surface Resin Layer

Like in the oil-containing resin layer, a Sylgard 184 main agent (manufactured by Dow Corning Toray Co., Ltd.) as a resin component, a Sylgard 184 curing agent (manufactured by Dow Corning Toray Co., Ltd.) also as a resin component, dimethyl siloxane oil (product #KF-96 50 cs, manufactured by Shin-Etsu Chemical Co., Ltd. Silicone Division) as the first oil component, and carbinol-modified siloxane oil (KF-6001, manufactured by Shin-Etsu Chemical Co., Ltd. Silicone Division) as the second oil component were mixed at a ratio (weight ratio) of 100:10:35:15. Next, the resulting mixture was poured onto the oil-containing resin layer in the mold produced in the above 1), and was then further cured at 100° C. for 3 h in an oven to form a surface resin layer. The surface resin layer had a thickness of 200 μm.

Example 12

1) Production of Oil-Containing Resin Layer

KE1935A/B (manufactured by Shin-Etsu Chemical Co., Ltd.) as a resin component, dimethyl siloxane oil (product #KF-96 50 cs, manufactured by Shin-Etsu Chemical Co., Ltd. Silicone Division) as the first oil component, and carbinol-modified oil (BY 16-201, manufactured by Dow Corning Toray Co., Ltd.) as the second oil component were mixed at a ratio (weight ratio) of 40:48:12. Next, the mixture was applied using an applicator onto a PET film (Lumirror S10 #75, manufactured by Toray Industries, Inc.), and was cured by heating under an environment at 150° C. for 3 min to form an oil-containing resin layer with a thickness of about 150 μm.

2) Production of Surface Resin Layer

Like in the oil-containing resin layer, KE1935A/B (manufactured by Shin-Etsu Chemical Co., Ltd.) as a resin component, dimethyl siloxane oil (product #KF-96 50 cs, manufactured by Shin-Etsu Chemical Co., Ltd. Silicone Division) as the first oil component, and carbinol-modified oil (BY 16-201, manufactured by Dow Corning Toray Co., Ltd.) as the second oil component were mixed at a ratio (weight ratio) of 66:27:7. Next, the resulting mixture was applied using an applicator onto the oil-containing resin layer produced in the above 1), and was then cured at 150° C. for 3 min in an oven to form a surface resin layer. The thickness of the surface resin layer was 50 μm.

Comparative Example 1

Substantially the same procedure as in Example 1 was repeated except that no surface resin layer was provided.

The Table below shows the evaluation results.

Note that with respect to the evaluations of "Phase Separation and Compatibility, etc. (e.g., a change in transmittance)" in the Table, the "First Oil/Second Oil" represents the phase separation and compatibility between the "first oil component" and the "second oil component" corresponding to the above-described a); the "First Oil/Resin" represents the miscibility between the "first oil component" and the "resin component in the oil-containing resin layer" corresponding to the above-described b); and the "Second Oil/Resin" represents the miscibility between the "second oil component" and the "resin component in the oil-containing resin layer" corresponding to the above-described c). Each evaluation result is listed.

is smaller than the difference between the solubility parameter value for the resin component in the oil-containing resin layer and the solubility parameter value for the second oil component, that is, $|11.9-13.9|=2.0$ $(J/cm^3)^{1/2}$. In addition, the difference in solubility parameter between the first oil component and the resin component of the oil-containing resin layer 11, that is, $|11.7-11.9|=0.2$ $(J/cm^3)^{1/2}$ is set to be within 0.6 $(J/cm^3)^{1/2}$.

Further, even in Example 8, the difference between the solubility parameter value for the resin component in the oil-containing resin layer and the solubility parameter value for the first oil component, that is, $|11.9-11.7|=0.2$ $(J/cm^3)^{1/2}$ is smaller than the difference between the solubility param-

TABLE 1

| | Surface resin layer (Superficial Layer) | | Oil-containing resin layer (Lower Layer) | | | Phase Separation and Compatibility, etc. (Change in Transmittance, etc.) | | | Surface | Surface | Surface | | −20° C. | |
|---|---|---|---|---|---|---|---|---|---|---|---|---|---|---|
| | Oil content | Layer Thickness (μm) | Oil content | Layer Thickness (μm) | Layer Thickness Ratio | First Oil/ Second Oil | First Oil/ Resin | Second Oil/ Resin | Oil Level 20° C. (μg/cm2) | Oil Level 0° C. (μg/cm2) | Oil Level −20° C. (μg/cm2) | Wear resistance (%) | Ice adhesion strength (N/cm2) | Water Resistance |
| Example 1 | 1.24 | 50 | 2.34 | 1000 | 0.05 | ○ | X | ○ | X | ○ | ○ | 200 | ◎ | ○ | 0.1 | 1 |
| Example 2 | | 100 | | | 0.1 | ○ | X | ○ | X | ○ | ○ | 200 | ◎ | ○ | 0.2 | 1 |
| Example 3 | | 200 | | | 0.2 | ○ | X | ○ | X | ○ | ○ | 100 | ◎ | ○ | 0.2 | 1 |
| Example 4 | | 350 | | | 0.35 | ○ | X | ○ | X | X | ○ | 100 | ◎ | ○ | 0.3 | 1 |
| Reference Example 1 | | 500 | | | 0.5 | ○ | X | ○ | X | X | X | <40 | ◎ | X | >1 | 1 |
| Reference Example 2 | | 750 | | | 0.75 | ○ | X | ○ | X | X | X | <40 | ◎ | X | >1 | 1 |
| Reference Example 3 | | 1000 | | | 1 | ○ | X | ○ | X | X | X | <40 | ◎ | X | >1 | 1 |
| Example 5 | 1.5 | 50 | | | 0.05 | ○ | X | ○ | X | ○ | ○ | 200 | ◎ | ○ | 0.1 | 1 |
| Example 6 | | 100 | | | 0.1 | ○ | X | ○ | X | ○ | ○ | 200 | ◎ | ○ | 0.1 | 1 |
| Example 7 | | 200 | | | 0.2 | ○ | X | ○ | X | ○ | ○ | 200 | ◎ | ○ | 0.1 | 1 |
| Example 8 | | 200 | | | 0.2 | ○ | X | ○ | X | ○ | ○ | 200 | ◎ | ◎ | <0.1 | 1 |
| Example 9 | | 350 | | | 0.35 | ○ | X | ○ | X | ○ | ○ | 200 | ◎ | ○ | 0.1 | 1 |
| Example 10 | | 500 | | | 0.5 | ○ | X | ○ | X | ○ | ○ | 200 | ◎ | ○ | 0.1 | 1 |
| Example 11 | | 750 | | | 0.75 | ○ | X | ○ | X | X | ○ | 100 | ◎ | ○ | 0.2 | 1 |
| Reference Example 4 | | 1000 | | | 1 | ○ | X | ○ | X | X | X | <40 | ◎ | X | >1 | 1 |
| Comparative Example 1 | — | 0 | | | — | ○ | X | ○ | X | X | X | <40 | X | ○ | 0.1 | 1 |
| Example 12 | 1.5 | 50 | 2.1 | 250 | 0.2 | ○ | X | ○ | X | X | ◎ | >300 | ◎ | ◎ | <0.1 | 1 |

According to the present configuration, by providing a surface resin layer, wear resistance remarkably increased not only in the Examples but also in the Reference Examples.

With respect to the solubility parameter which is an indicator to determine how easily a solvent and a solute are mixed, in the Example 1 and others, the difference between the solubility parameter value for the resin component in the oil-containing resin layer and the solubility parameter value for the first oil component, that is, $|11.9-11.7|=0.2$ $(J/cm^3)^{1/2}$ eter value for the resin component in the oil-containing resin layer and the solubility parameter value for the second oil component, that is, $|11.9-12.2|=0.3$ $(J/cm^3)^{1/2}$. Furthermore, the difference in solubility parameter between the first oil component and the resin component of the oil-containing resin layer 11, that is, $|11.7-11.9|=0.2$ $(J/cm^3)^{1/2}$ is set to be within 0.6 $(j/cm^3)^{1/2}$.

With respect to the phase separation and the compatibility, the transmittance of the mixture of the first oil component and the second oil component was significantly changed when the temperature changed from 20° C. to 3° C. Thus, it is evident that the first oil component and the second oil component were phase-separated.

The first oil component did not substantially exude onto the surface of the oil-containing resin layer at a temperature of 20° C. or 3° C. Thus, it can be said that the first oil component was miscible with the resin component of the oil-containing resin layer. By contrast, the second oil component exuded from the surface of the oil-containing resin layer when the oil-containing resin layer was placed under an environment at 20° C. and did not substantially exude when placed under an environment at 3° C. This behavior corresponds to the phase separation between the first oil component and the second oil component. This result has revealed that the behavior of the second oil component was changed in response to a temperature change in the presence of the first oil component. Further, the second oil component is miscible with the resin component in the surface resin layer under an environment at 20° C., but is immiscible with the resin component in the surface resin layer under an environment at 3° C. This behavior is also clear from the results of the surface oil level.

In the Examples, the surface oil level and the ice adhesion strength were not each a significant value at ordinary temperature such as at 20° C. Once the temperature reached the predetermined value or lower, the surface oil level, for instance, at −20° C. was 40 μg/cm$^2$ or higher. As a result, the ice adhesion strength was less than 1.0. In addition, the oil component bled from the surface resin layer 12 is primarily the second oil component of the oil components included in the oil-containing resin layer. This configuration enables the prevention of conventional excessive bleeding of the oil component and thus the use of the second oil component to prevent, for instance, ice/snow accretion while preventing useless bleeding. Note that in the Examples and others, the first oil component and the second oil component were included not only in the oil-containing resin layer but also in the surface resin layer. The second oil component was recovered from the surface resin layer in an amount more than the amount of the second oil component included in the surface resin layer. Thus, it can be said that the second oil component included in the oil-containing resin layer exuded from the oil-containing resin layer and further bled from the surface resin layer. Here, also from this fact, it is evident that the surface resin layer 12 has enough oil permeability to permeate the second oil component exuding from the oil-containing resin layer to the surface of the surface resin layer.

As demonstrated in Example 8, in the case where carbinol-modified silicone oil was used as the second oil component, the ice adhesion strength, in particular, was decreased markedly. This may be because this case is speculated to have higher wettability to the oil-containing resin layer than the case of using phenyl-modified silicone oil as the second oil component.

Note that the temperature at which the second oil component is phase-separated from the first oil component, in other words, the temperature at which the second oil component bleeds from the surface resin layer can be adjusted by selecting the first oil component and the second oil component appropriately. Thus, the second oil component can function as a low-temperature exuding oil component at various temperatures such as at the freezing point or a temperature lower than the freezing point or even at a temperature higher than the freezing point.

The results of the water resistance in any of the Examples were favorable.

Hereinabove, the present invention can provide a sheet body having an improved function of preventing icing and/or snow accretion, and can also provide a sheet body having enough strength to endure, for instance, outdoor use.

It should be understood that the above description involves preferred embodiments and simply represents articles. It can be recognized that altered and modified distinct embodiments are readily made clear to those skilled in the art in light of the above teachings. Thus, exemplified embodiments and alternative embodiments can be implemented without departing from the spirit of articles set forth in the Claims attached.

REFERENCE SIGNS LIST

11 Oil-containing resin layer
12 Surface resin layer
13 Base material
14 Adhesive layer
15 Separator
16 Oil-impermeable resin layer

The invention claimed is:

1. A sheet body, comprising:
a solid oil-containing resin layer comprising:
an oil; and
an oil-permeable surface resin layer that has higher wear resistance than the oil-containing resin layer and is layered on one of surfaces of the oil-containing resin layer, wherein
the oil included in the oil-containing resin layer comprises a low-temperature exuding oil component capable of exuding from the oil-containing resin layer when a temperature is 0° C. or lower,
the surface resin layer has enough oil permeability to permeate the low-temperature exuding oil component exuding from the oil-containing resin layer to a surface of the surface resin layer that is opposite to a side of the oil-containing resin layer,
the oil included in the oil-containing resin layer comprises a first oil component and a second oil component,
the second oil component constitutes a low-temperature phase-separable oil component that can be phase-separated from the first oil component to exude from the oil-containing resin layer only when the temperature is 0° C. or lower, and
a surface oil level at −20° C. is 40 μg/cm$^2$ or higher.

2. The sheet body according to claim 1, wherein the oil included in the oil-containing resin layer comprises a first oil component and a second oil component; a difference between a solubility parameter value (SP value) for a resin component in the oil-containing resin layer and a solubility parameter value for the first oil component is smaller than a difference between a solubility parameter value (SP value) for the resin component in the oil-containing resin layer and a solubility parameter value for the second oil component; and the second oil component constitutes the low-temperature phase-separable oil component.

3. The sheet body according to claim 2, wherein the oil-containing resin layer comprises the resin component in a proportion of 25 wt % or more based on a total weight of the oil-containing resin layer under a temperature environment where the second oil component is not phase-separated.

4. The sheet body according to claim 1, wherein the surface resin layer has a thickness of 750 μm or less.

5. The sheet body according to claim 2, wherein the resin component is a crosslinked silicone resin, and the first and second oil components are silicone oil.

6. The sheet body according to claim 1, further comprising a base material provided on the other surface opposite to the one surface of the oil-containing resin layer.

7. The sheet body according to claim 6, wherein the base material is used to form an oil-impermeable resin layer that is impermeable to the oil.

8. The sheet body according to claim 6, further comprising:
an adhesive layer provided on a surface of the base material that is opposite to the surface on which the oil-containing resin layer is provided; and
a separator detachably attached to an outside surface of the adhesive layer.

9. The sheet body according to claim 1, further comprising:
an adhesive layer provided on the other surface opposite to the one surface of the oil-containing resin layer; and
a separator detachably attached to an outside surface of the adhesive layer.

10. The sheet body according to claim 9, wherein an oil-impermeable resin layer that is impermeable to the oil is provided between the oil-containing resin layer and the adhesive layer, or the adhesive layer forms an oil-impermeable resin layer that is impermeable to the oil.

11. The sheet body according to claim 1, wherein the surface resin layer has a reduction rate of less than 80% when the reduction rate is determined by using #120-mesh sandpaper and reciprocating the sandpaper on the sheet body 100 times at a speed of 100 mm/s under pressure applied at 125 g/cm$^2$.

12. The sheet body according to claim 1, wherein a difference in solubility parameter between the first oil component and the resin component is within 0.6 (J/cm$^3$)$^{1/2}$.

13. A sheet body, comprising:
a solid oil-containing resin layer comprising:
a first oil component; and
a second oil component,
wherein
the second oil component constitutes a low-temperature phase-separable oil component that can be phase-separated from the first oil component to exude from the oil-containing resin layer only when a temperature is 0° C. or lower, and
a surface oil level at −20° C. is 40 g/cm$^2$ or higher.

14. The sheet body according to claim 13, further comprising an oil-permeable surface resin layer that is layered on one of surfaces of the oil-containing resin layer and has higher wear resistance than the oil-containing resin layer, wherein
the surface resin layer has enough oil permeability to permeate a low-temperature exuding oil component exuding from the oil-containing resin layer to a surface of the surface resin layer that is opposite to a side of the oil-containing resin layer.

* * * * *